United States Patent [19]

Hamilton et al.

[11] Patent Number: 4,690,185
[45] Date of Patent: Sep. 1, 1987

[54] RIM DRIVEN ROTARY CUTTER AND TREE FELLING HEAD INCORPORATING THE SAME

[75] Inventors: Douglas D. Hamilton; Robert M. Palfy; Hans Viereck, all of Montreal, Canada

[73] Assignee: Logging Development Corporation, Montreal, Canada

[21] Appl. No.: 820,053

[22] Filed: Jan. 21, 1986

[51] Int. Cl.⁴ .......................... A01G 23/08; B27B 5/14
[52] U.S. Cl. ................................... 144/34 R; 83/640; 83/643; 144/3 D
[58] Field of Search ................ 30/389; 144/2 Z, 3 D, 144/34 R; 83/643, 640

[56] References Cited

U.S. PATENT DOCUMENTS

| | | | |
|---|---|---|---|
| 1,179,910 | 4/1916 | Greenfield | 30/389 |
| 2,804,105 | 8/1957 | Stone | 83/643 |
| 3,808,685 | 5/1974 | Santilli | 30/389 |
| 3,915,209 | 10/1975 | Denis | 144/34 R |
| 4,446,897 | 5/1984 | Kurelek | 144/34 R |
| 4,491,163 | 1/1985 | Kurelek | 144/34 R |
| 4,593,733 | 6/1986 | Hamilton | 144/34 R |

*Primary Examiner*—W. D. Bray
*Attorney, Agent, or Firm*—Stanley E. Johnson

[57] ABSTRACT

A rim driven circular saw and a drive pinion rotatable about respective ones of a pair of spaced apart parallel axes wherein each of the saw and pinion having projections of gear tooth form about the outer periphery thereof with the teeth of one meshing with those of the other. The teeth on the saw each have a cutting edge set back from the normal intersection of the face and the top land of the teeth. The saw is journalled for rotation on a plate carried by a rigid frame and the plate has a thickness at least no greater than the kerf generated by the saw. The pinion is fabricated from a non-metallic substance such as nylon. Also disclosed is an accumulator type tree felling head incorporating, as the cutting device, a saw of the foregoing type.

40 Claims, 12 Drawing Figures

RIM DRIVEN ROTARY CUTTER AND TREE FELLING HEAD INCORPORATING THE SAME

This application is related to applicant's U.S. pending application No. 605,219, filed Apr. 30, 1984.

FIELD OF INVENTION

This invention relates to an apparatus for cross-cutting trees incorporating an improved rim driven circular saw and new and useful improvements in rim driven circular saws.

The present application is closely related to U.S. application Ser. No. 605,219 filed Apr. 30, 1984 referred to above and entitled TREE FELLING HEAD HAVING A RIM DRIVEN ROTARY CUTTER. It is directed to improvements thereto and more particularly to the configuration and materials for the driving and driven members of the saw, to apparatus to keep them clean, to the bearing and support arrangements of the saw, and to the combination of the saw assembly with grapples to form a felling head.

BACKGROUND OF INVENTION

The valuable part of a tree is the butt area where the felling cut is made and there has been increasing concern over the damage being done to this area by shear severing devices with the consequence of numerous proposals having been made adapting chain saws and circular center spindle mounted saw blades and cutting discs on felling heads for cutting trees. Chain saws, however, are fragile and thus subject to frequent failure. Circular saws, while they are more robust, are also more bulky. Also, they usually are run at higher speeds with an attendant increase in safety and saw damage hazards. Because of these drawbacks, applicant has adapted the rim driven saw principle. These saws are inherently compact as they do not need a central arbour for driving purposes. They can be robust in construction and operated at moderate to low speeds and thus avoid many of the disadvantages as well as safety and damage hazards associated with high speed, previously used circular saws.

One form of rim driven saw for applicant's intended purpose is disclosed in the aforementioned appplication Ser. No. 605,219.

Other rim driven type saws are also known, as for exapmle those disclosed in the following patents:
  Canadian Patent No. 983,825 issued, Feb. 17, 1976—Jonsson
  Canadian Patent No. 994,647, issued Aug. 10, 1976—Wiklund
  U.S. Pat. No. 2,490,255, issued Dec. 6, 1949—Chase
  U.S. Pat. No. 2,599,495, issued June 3, 1952—Smith
  U.S. Pat. No. 2,701,590, issued Feb. 8, 1955—Barker
  U.S. Pat. No. 2,804,105, issued Aug. 27, 1957—Stone
  U.S. Pat. No. 2,972,363, issued Feb. 21, 1961—Santilli
  U.S. Pat. No. 3,930,310, issued, Jan. 6, 1976—Santilli
  U.S. Pat. No. 460,679, issued Oct. 6, 1891—Hammond In addition to the foregoing there is commercially available a tree feller incorporating a rim driven saw distributed in Canada by Risley Equipment Ltd. of Grande Prairie, Alberta and is sold under the trade name "RotoSaw".

Applicant's device, as will be found hereinafter, incorporates a number of features and combinations thereof which distinguishes over the foregoing known devices.

SUMMARY OF INVENTION

The general purpose of the present invention is to provide an improved tree cutting rim driven circular saw and a tree felling head incorporating the same.

In accordance with one aspect of the present invention the saw blade and the drive pinion therefore are located substantially in the same plane. The drive pinion incorporates conventionally formed gear teeth and the saw teeth combine conventional gear tooth and saw tooth technology. In the saw tooth the trailing face and flank is of conventional gear form to mate with the driving pinion and the leading face, flank and the top land are shaped to provide suitable hook, sharpness, and clearance angles according to conventional saw tooth technology. One of the drawbacks of this design is that under certain conditions, for example when the power source driving the pinion is decelerated rapidly or suddenly stopped, the inertia of the saw results in the saw trying to drive the pinion in which case contact may be made between it and the cutting edge of the saw teeth. This can cause wear or damage on the cutting edge and/or the drive pinion teeth. This, however, can be alleviated by using an overrunning clutch in the drive pinion mounting.

In another aspect of the present invention there is a novel tooth form that avoids possible contact as described in the foregoing between the cutting edge of the saw teeth and the teeth on the drive pinion thus eliminating that source of wear and the need for an overrunning clutch as mentioned above.

The novel tooth form is such that the teeth or cutting projections, located about the perimeter of a circular saw blade, can be engaged for driving rotation by a drive pinion which itself has conventional gear teeth thereabout. This novel design further ensures positive meshing engagement of the pinion with the circular saw at all times including abrupt stoppage of the drive pinion or reverse rotation of the saw blade from its normal direction of rotation whilst at all times avoiding contact between the cutting edge of the saw blade projections and the teeth of the drive pinion.

In accordance with this aspect of the invention, the saw blade is of a type including a circular body portion, which may be either an annulus or disc, and a plurality of equally spaced apart and alike cutting projections which extend radially outwardly from a periphery of the body portion. Each of the projections has a profile of a conventional gear tooth that includes, relative to the direction of saw rotation, a top land portion, a leading and trailing face portion and a leading and trailing flank portion. The leading face portion is, however, modified by a cut out which extends from proximate a juncture of the leading face and flank portions to a line on the top land. This line locates the cutting edge of the saw and the aforementioned cut out can be such that the said edge is set back from the normal point of intersection of the top land and the leading face of the gear tooth thus avoiding interference with the pinion.

It is desirable to have the leading flank of the projections left unmodified to the extent that the contact ratio between the gear teeth of the pinion used to drive the saw blade and the projections on the saw blade is one or more when the rotation is opposite to the cutting direction. The modified portion can also be shaped to provide a suitable hook angle for the leading edge of the cutter.

Advantageously, the top land of the modified cutting projections as above described can itself be modified so as to provide a clearance angle rearward of the cutting edge in order to avoid excess friction between the cutting projections and the wood in process. The location of the edge can be adjusted if necessary to optimize the arrangement.

While there are many gear profiles which will provide satisfactory conjugate action the involute type is preferred and is displayed. Its dominance in industry will enhance the utility of this invention.

The teeth of the drive pinion display an involute profile and meshingly engage with the cutting projections of the blade, as modified. As indicated above, the set back of the cutting edge from the otherwise normal intersection of a gear tooth top land with its leading face is a distance sufficient to avoid contact of the cutting edge with the teeth of the driving pinion.

The cutting edges can be an integral part of the cutting projections with brazed on carbide or other hard substance or they can be detachably bolted on tips each incorporating one or more cutting edges with or without carbide edges or the like. The multi edge cutting tips that are detachably mounted can be reversible to prolong the life of the cutter.

In the applicant's device, the mating of the pinion and the saw teeth is in the open and without conventional lubrication. The components are subject to contamination, such as wood chips from the saw, with resulting shocks to the system and accelerated wear rates. To reduce these problems to economically acceptable proportions applicant's preference is for the pinion to be made of non-metallic material such as nylon. This material is light, inexpensive, and its strength and wear characteristics can be enhanced if needed by the addition of materials such as glass fibre and PTFE (Polytetrafluoroethylene). It also acts as a sacrifical member to limit loading on other components of the system. Other synthetics or rubber compounds may also prove effective in this application. Steel, cast iron, or bronze may also have application.

The removal of chips or other debris from between the cutting teeth and/or saw support frame are also provided for. Two types of cleaning devices are proposed, while, of course, there may be others. One is an idler sprocket having projections thereon that mate with the teeth of the cutter and clears them of mterial that is caught between the teeth. In addition, or alternative thereto, an air jet may be used to blow away the debris resulting from cutting and/or the support frame for the cutter may be designed to permit easy escape of the chips during cutting.

According to a still further aspect of the present invention, the cutting disc, i.e. the circular saw blade, is supported on a base member and driven at or near the outer periphery.

The saw blade is fully supported and journalled on a base plate which is fixed to a supporting arm used to mount the cutting assembly on the frame of the felling head. The rotatable saw blade is supported on the base plate by bearing means which include an outer bronze bearing ring. This ring carries any upward loads from the saw blade and can share loads in the plane of the saw with a central bronze bearing. A third bronze bearing at the outer edge of the saw carries any downward loads on the saw. A lubrication line, through the base plate, carries oil to the central bearing from which it flows back to the bearings at the periphery. Applicant has found during field testing of a prototype of the subject saw that very little wear takes place on the aforementioned outer bronze rings and further that the central bronze ring carries most loads. It has been further discovered that efficient rotational speeds of the saw blade cause the loads on the central bronze bearing to exceed normal pressure-velocity ratings for such materials. It is therefore an improvement to replace the central bronze bearing with a ball or roller bearing.

While the saw can be operated over a wide range of speeds, a low to moderate speed arrangement is preferred as it reduces damage to teeth and the danger potential of high speed saws.

The required power is applied through a conventional hydraulic motor unit of sufficient power to effect cutting and to overcome extraneous forces such as those which might be exerted by leaning trees.

In the embodiment illustrated in this application, the saw is mounted on an arm which is pivotally connected to a frame which in turn supports pivotal grapple arms. The saw and the arms acting together comprise a felling head. The felling head is carried from tree to tree by a vehicle equiped with mounting forks or a boom as is well known in the art. It will be obvious to anyone skilled in the art that the mounting arrangement for this novel saw and the manner of operation and co-operation with the grapples is flexible and can, for instance, be similar to that illustrated in Canadian patent Nos. 1,135,599 and 1,161,342 or the RotoSaw felling head.

LIST OF DRAWINGS

The invention is illustrated by way of example with reference to the accompanying drawings wherein.

DESCRIPTION OF PREFERRED EMBODIMENT

Figure 1:
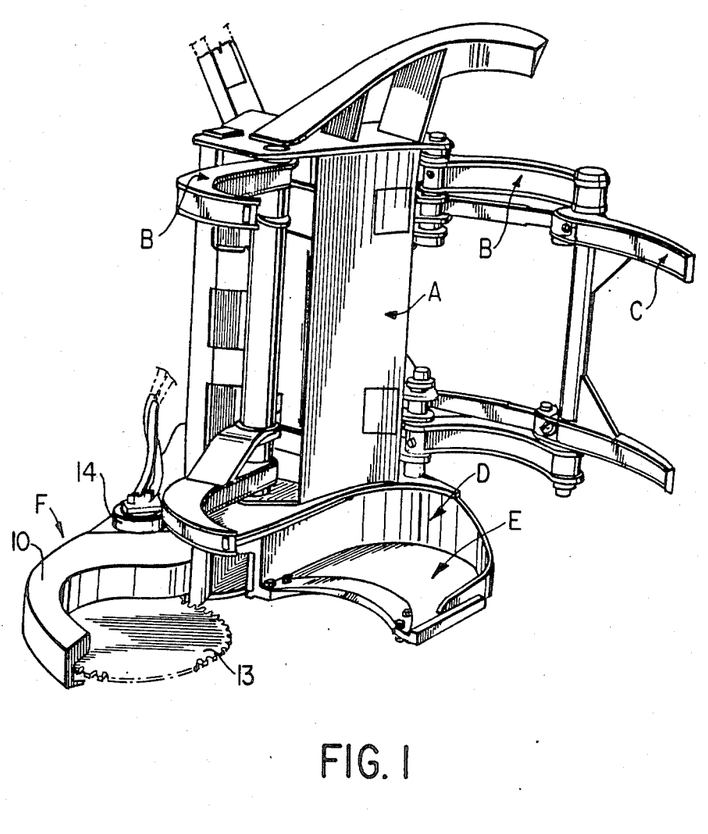
FIG. 1 is an oblique view of a tree felling head incorporating a rim driven saw in accordance with the present invention.

Referring to the drawings there is illustrated in FIG. 1, an accumulator type tree felling head for mounting on the free outer end of a boom or lift forks carried by a mobile vehicle. The felling head includes a rigid frame A on which there is mounted a pair of grapple arms B, one of the grapple arms having fingers C pivotally mounted thereon for accumulating trees in a tree accumulating area designated D below which there is a horizontal plate E for supporting the butt end of the cut trees. On the lower end of the frame there is pivotally mounted a tree severing device F.

Figure 8:
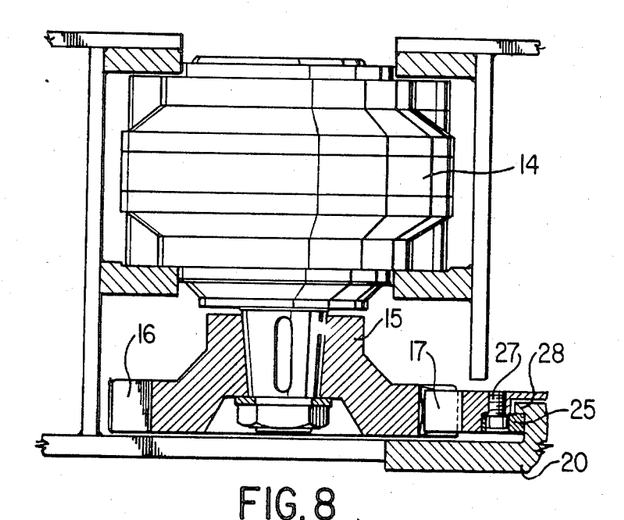
FIG. 8 is a sectional view taken along line VIII—VIII of FIG. 3.

The severing device (FIG. 2) includes an arm or saw support frame 10 pivotally attached to the base of the felling head frame A by a pivot pin 11 and is controllably moved by an hydraulic cylinder unit 12 connected thereto. A rotary cutting circular saw 13 (i.e. a circular disc) is mounted on the support frame 10 in a manner described hereinafter and is rim driven by an hydraulic motor 14 through pinion 15 (see FIG. 8). The teeth 16 of the pinion mate with the combined gear and cutting teeth 17 on the outer periphery of the circular saw. The arm 10 has a base plate 20 rigidly secured thereto along with arm component 3 and which underlies and supports the circular saw 13.

Figures 2, 10:
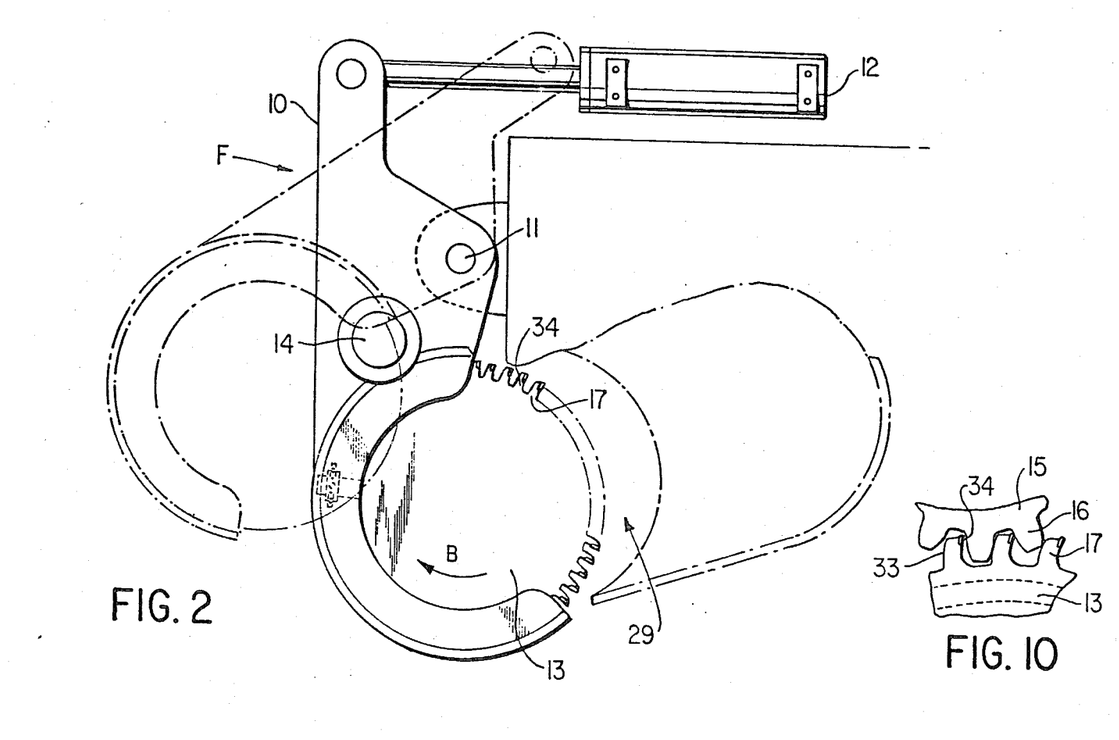
FIG. 2 is a partial top plan view of the tree cutting mechanism of the tree felling head shown in FIG. 1.
FIG. 10 is a partial top plan view illustrating the meshing of the drive pinion with the cutting member having one form of cutting teeth.

The circular saw is supported on the base plate 20 by a first annular bearing 23, a second annular bearing 24, and a third annular bearing 25, all of which are concentrically disposed and radially spaced outwardly from one another and the axis of rotation Y—Y of the circular saw. Bearing 23 is mounted on the base plate 20 and engages an annular flange 26 projecting downwardly from the circular saw 13. Bearing 24 is secured to the base plate 20 and engages the underlying surface of the saw 13 and bearing 25 is secured to the saw blade 13 by way of a plurality of studs 27. The annular bearing 25 engages the undersurface of a lip 28 on the base plate thereby positively retaining the saw blade on the base plate 20. The bearings 23, 24, 25 are lubricated by a suitable lubricant provided under pressure by way of passage 29 provided in the base plate.

The circular saw 13 is driven by way of the hydraulic motor 14 (FIG. 7) having the pinion 15 secured thereto and provided with gear teeth 16 that are in direct engagement with the rear face 33 of the saw blade cutting teeth 17 (see FIG. 10). The rear face 33 of the cutting projection and the gear teeth 17 are appropriately designed for meshing as regular gear teeth. The leading face of the cutting members 17 are provided with carbide tip cutting edges 34 permanently or detachably secured thereto.

Figure 3:
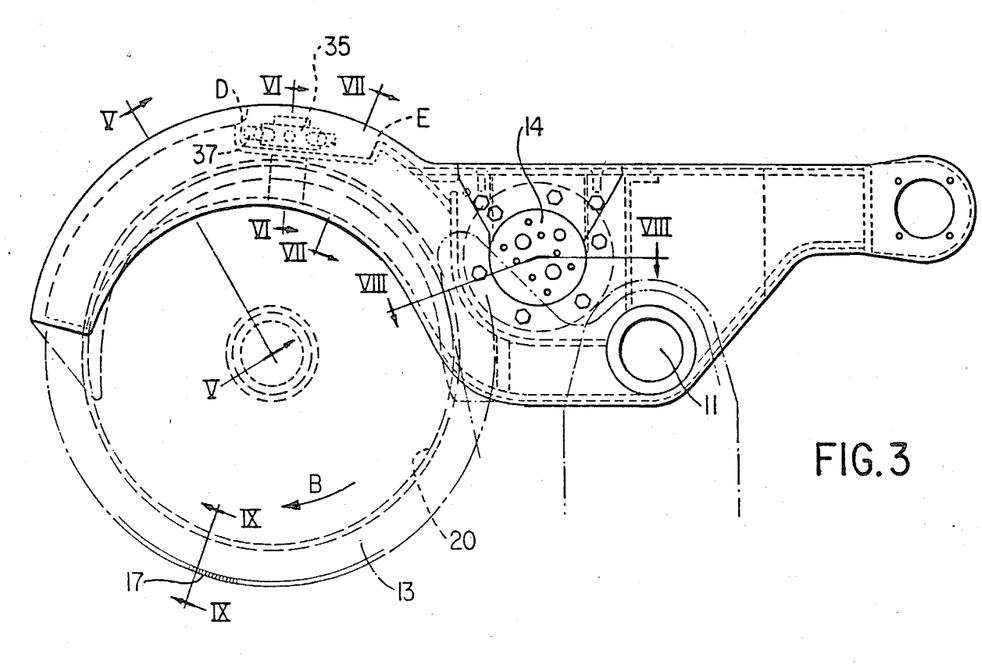
FIG. 3 is similar to FIG. 2 on a somewhat larger scale and showing in more detail the construction of the cutting mechanism and the location of the cleaning mechanisms.
Figure 4:
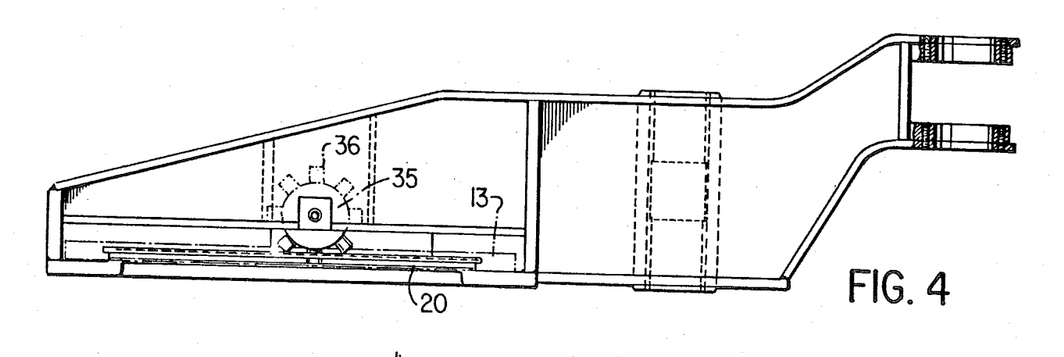
FIG. 4 is a partial elevational view of the frame and saw cutting mechanism illustrated in FIG. 3.
Figure 5:
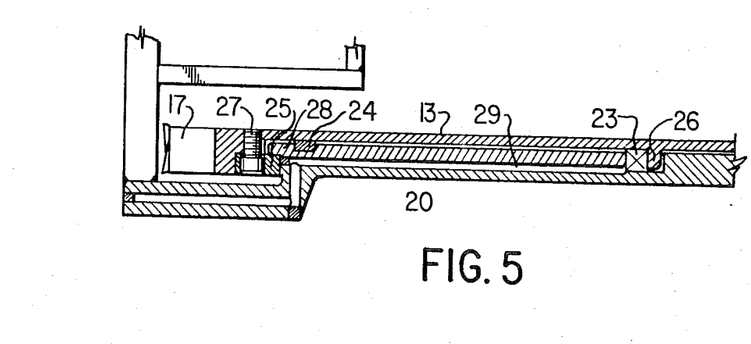
FIG. 5 is a partial sectional view taken essentially along Section V—V of FIG. 3.
Figure 6:
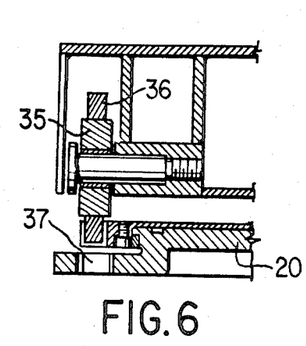
FIG. 6 is a sectional view taken essentially along line VI—VI of FIG. 3.
Figure 7:
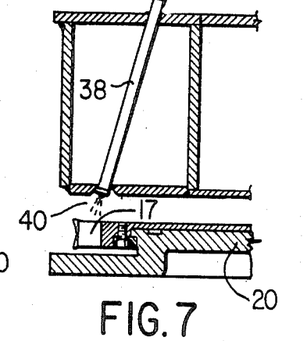
FIG. 7 is a sectional view taken along line VII—VII of FIG. 3.

The saw blade 13 is driven in the direction indicated by arrow B in FIG. 3 and chips, which form as a result of cutting, are ejected from the U-shaped channel frame by centrifugal force or by one or both of the two different provisions. One provision consists of an idler 35 (FIG. 6) having projections 36 thereon that mesh with the saw blade teeth 17 so as to drive the chips from between the cutting formation downwardly through an opening 37 in the bottom portion of the frame. The second means of ejecting debris from the teeth consists of an air jet directed downwardly between the cutting formations as illustrated in FIG. 7. The air jet is directed by way of a conduit 38 downwardly toward the cutting formations 17 and angularly outward. Such chips are driven through a discharge opening 40 in the frame that extends approximately from points D to E as indicated in FIG. 3. The further discharge of chips, resulting from cutting, will be removed by centrifugal action through rotation of the cutting member, such chips being discharged directly off the saw beyond approximate section IX—IX and through the partial arcuate opening 40 extending from point D to E on the frame.

From the foregoing and as illustrated in the drawings there is provided a rotary cutting member consisting of a solid disc positively mounted by bearing means on a base plate, lubrication being provided for the bearings and different means provided for discharging the chips during a cutting operation.

Figure 9:
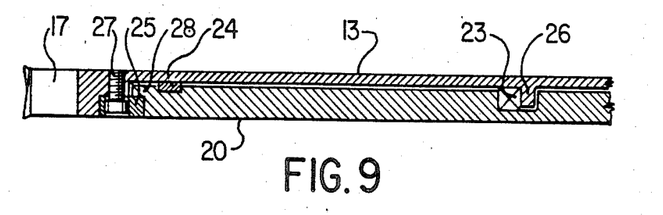
FIG. 9 is a sectional view taken along line IX—IX of FIG. 3.

FIG. 9 is a section taken essentially along line IX—IX of FIG. 3, from which it can be seen the cutting projections 17 extend radially beyond the base plate 20 with the kerf of the cutting member being slightly greater than the thickness of the base plate 20 and the saw blade 13.

The saw blade 13, as shown in FIG. 10, has cutting tips 34 which, as previously mentioned, can engage the rear face of pinion teeth 16 when the pinion is decelerated or stopped rapidly because of the inertial effects of the saw blade. This could be overcome by having an undercut in the teeth 16 of the pinion but, obviously, such undercut would substantially weaken the teeth. Another alternative consists of having the cutting edge 34 offset rearwardly relative to the direction of rotation of the saw blade and modify the shape of the cutting formations 33 whereby upon deceleration of the pinion the teeth on the saw blade mate with the teeth on the pinion preventing direct contact of the cutting edge 34 of the rear face of the pinion teeth. This embodiment is illustrated in more detail in FIGS. 11 and 12.

Figure 11:
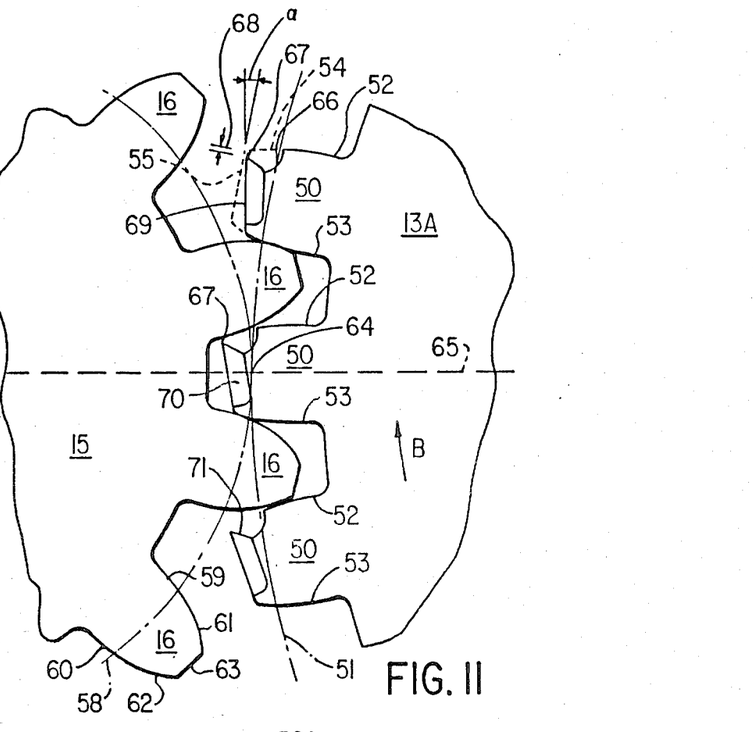
FIG. 11 is a partial top plan view of the engagement of the teeth of the drive sprocket with modified cutting projections on the circular saw.
Figure 12:
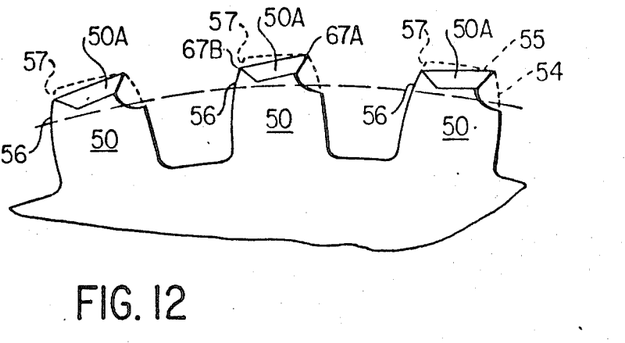
FIG. 12 is a partial plan view of a circular saw blade having reversible and removable cutting tips.

Referring now to FIGS. 11 and 12 there is illustrated a portion of a circular saw blade 13A having cutting projections or saw teeth 50 equally spaced about the outer periphery of the circular saw blade and meshing with the teeth 16 of the pinion 15. Each saw tooth 50, as illustrated, has an involute gear tooth profile and which, relative to pitch circle 51 have leading and trailing flanks 52 and 53, respectively, and a leading face illustrated by broken line 54, a top land portion also illustrated in broken line at 55. The trailing face portion of the conventional gear tooth is shown and consists of the combination 56 and 57; the latter being illustrated in broken line.

The driving pinion 15 includes a plurality of involute gear teeth 16 which relative to the pitch circle 58 of the driven pinion, and like the saw blade, display leading and trailing flanks 59, 60, respectively, leading and trailing faces 61, 62, respectively, and top lands 63.

Pitch circles 51 and 58 coincide or meet at 64 and are themselves bisected by broken line 65 which is a line running through the centers of rotation (not shown) of pinion 15 and circular saw blade 13A all according to conventional gear layout.

As best illustrated with reference to the upper cutting tooth 50 seen in FIG. 11, a cut out 66 in the leading face portion extends from the proximate juncture of leading face 54 and flank 52 to cutting edge or tip 67 on the proximate top land 55. Compared to a profile of a standard gear tooth, the cutting edge 67 is set back a distance indicated by opposed arrows 68 which distance is sufficient to avoid contact of the cutting edge 67 with the trailing flank portion 60 of drive pinion 15. This is best seen with reference to cutting projection 50 located at the common point of pitch circles 51 and 58 and line 65.

As also seen in FIG. 11 and more particularly with reference to the upper cutting tooth 50, a clearance angle $\alpha$ is established between the actual top land 69 and the normal top land 55 of a conventional gear tooth in order to facilitate entry into the work piece to be cut as is well known in the art. Further, the cutting tip 67 can form part of a replaceable cutter 70 secured to projection 50 in a known manner such as attachment screws (not shown). Further, the cut out 66 and more particularly the replaceable cutter 70 can be so modified to give the rake angles as the cutting dictates may require.

With reference to FIG. 12, the same reference numerals of FIG. 11 apply for like parts. However, in this particular embodiment, a cutter 50A which forms the actual top land 69 carries with it at either of its ends cutting tips 67A and 67B. As before, cutter 50A is attached to the projections in a known manner (not shown) and are thus removable, replaceable or, as seen in FIG. 12, reversible. When leading edge 67A is dull, the cutter or insert 50A is rotated so that cutting edge 67B is presented for service.

As previously mentioned the engagement of the pinion 15 and the saw 13 is open and, therefore, subject to accelerated wear and shock loads because of contaminants such as dirt and wood chips. These negative effects can be reduced by cleaning devices such as those illustrated in FIGS. 6 and 7. Experience has shown, however, that such devices may not be required if the correct pinion material is chosen. Steel, cast iron, and bronze may be useful in some cases but non-metallic substances such as rubber or nylon appear preferable. Pinions made from basic nylon resins give an acceptable economic life because they can be produced at low cost. They offer the prospect of increased strength through reinforcement with fibres such as fibre glass as well as reduced wear through additon of lubricants such as PTFE. They minimize the wear on the expensive saw member, reduce noise, and in the case of excessive loads act as a sacrifical member to provide smash-up protection for the rest of the components. If desired, the teeth of the pinion only may be formed from such material and in some manner connected to, for example, a metal hub but such attachment and construction is difficult and expensive. The purpose of utilizing a plastics material, plastic material, rubber or something similar, is because of the resiliency of the material which allows for some deflection when grit, dirt, chips, or the like, get between the driving faces of the gear teeth on the pinion and the saw blade. Also, it is preferable that the pinion teeth be damaged or worn as opposed to the teeth on the saw blade since the pinion is more easily and cheaply replaced. The pinion, as a matter of fact, could be made from rubber or various rubber or synthetic rubber compounds suitably reinforced. Also, by utilizing a plastics material, plastic material and/or rubber, the pinion can be molded as opposed to being shaped in a gear cutting machine. The resiliency of a nylon pinion also cuts down substantially the noise normally encountered from a loose mesh of the gear teeth, loose meshing being desirable as it allows for more readily clearing of saw dust, chips, and the like encountered from the cutting operation.

The embodiments of the invention in which an exclusive property or privilege is claimed are defined as follows:

1. A rim driven saw for cutting trees comprising a planar circular saw blade having combined gear and cutting teeth around the outer periphery thereof and a power driven pinion mounted on a supporting frame, said pinion having gear teeth meshing with said combined gear and cutting teeth of the saw, said saw and pinion being disposed in substantially the same plane, one face of each of said combined gear and cutting teeth on the saw being an active profile of a standard gear tooth mating with teeth on the drive pinion and in the other face having a cutting edge thereon each of said combined gear and cutting teeth having a profile of a conventional gear tooth that includes, relative to the direction of saw rotation, a top land portion, a leading and trailing face portion and a leading and trailing flank portion wherein the leading face portion is modified by a cut out which extends from a proximate a juncture of the leading face and flank portions to a leading edge of a cutter located at intersection of the said cut out portion and said top land.

2. The rim driven circular saw as claimed in claim 1 wherein said cutter edge is set back from a point of normal intersection of said top land and said face of a conventional gear tooth.

3. The rim driven circular saw as claimed in claim 2 wherein said top land portion includes a clearance angle cut out which extends away from said cutting edge.

4. The rim driven circular saw as claimed in claim 1 wherein said conventional gear tooth is in the form of an involute gear tooth.

5. The rim driven circular saw as claimed in claim 1 wherein each said combined gear and cutting tooth includes a replaceable cutter.

6. A rim driven circular saw as in claim 5 wherein said replaceable cutter is reversible and includes at least two cutting edges.

7. The rim driven circular saw as claimed in claim 1 wherein said circular saw is a disc.

8. The rim driven saw as defined in claim 1 wherein said circular saw in an annulus.

9. The rim driven circular saw blade as claimed in claim 1 wherein said drive pinion has conventional gear teeth.

10. The rim driven circular saw as claimed in claim 1 wherein said cutting edge is set back from a normal intersection of said leading face and said top land of a conventional gear tooth a distance sufficient to avoid contact of said cutting edge with said driving pinion teeth.

11. The rim driven circular saw as claimed in claim 1 wherein the modifications to the leading face and the top land are such that a tooth of the driving pinion is always in contact with at least one of said trailing portions and said leading portions when the direction of rotation is reversed.

12. The rim driven circular saw as claimed in claim 1 wherein said gear teeth of said driving pinion and said combined gear and cutting teeth on the saw prior to modification, have an involute gear form.

13. A rim driven saw as defined in claim 1 wherein at least the teeth of the drive pinion are made of a softer material than that of the gear tooth portions of the saw.

14. A rim driven saw as defined in claim 13 wherein said drive pinion is made of non-metallic material.

15. A rim driven saw as claimed as defined in claim 14 wherein said drive pinion is made from a plastics material.

16. A rim driven saw as defined in claim 15 wherein said plastics material is nylon.

17. A rim driven saw for cutting trees comprising a planar circular saw blade having combined gear and cutting teeth around the outer periphery thereof and a power driven pinion mounted on a supporting frame, said pinion having gear teeth meshing with said combined gear and cutting teeth of the saw, said saw and pinion being disposed in substantially the same plane, one face of each of said combined gear and cutting teeth on the saw being an active profile of a standard gear tooth mating with teeth on the drive pinion and in the other face having a cutting edge thereon and means for clearing debris such as chips and the like from between the teeth on the saw, said means comprising an idler sprocket having formations projecting therefrom and mating with the teeth on the saw to extrude material caught therebetween and propel the same through suitable openings in the supporting frame.

18. A rim driven saw for cutting trees comprising a planar circular saw blade having combined gear and cutting teeth around the outer periphery thereof and a power driven pinion mounted on a supporting frame, said pinion having gear teeth meshing with said combined gear and cutting teeth of the saw, said saw and pinion being disposed in substantially the same plane, one face of each of said combined gear and cutting teeth on the saw being an active profile of a standard gear tooth mating with teeth on the drive pinion and in the other face having a cutting edge thereon and means for clearing debris from between the cutting formations on the saw comprising an air jet directed downwardly and outwardly relative to the driven saw and including a suitable opening in said supporting frame to allow the chips to escape therethrough.

19. A rim driven saw as defined in claim 1 wherein said support frame includes an arm portion, from which the saw blade projects, and a plate underlying the saw and including bearing means supporting the saw on said plate.

20. A rim driven saw as defined in claim 19 wherein said bearing means comprises at least two annular bearings interposed between the saw and said plate.

21. A rim driven saw for cutting trees comprising a planar circular saw blade having combined gear and cutting teeth around the outer periphery thereof and a power driven pinion mounted on a supporting frame, said pinion having gear teeth meshing with said combined gear and cutting teeth of the saw, said saw and pinion being disposed in substantially the same plane, one face of each of said combined gear and cutting teeth on the saw being an active profile of a standard gear tooth mating with teeth on the drive pinion and in the other face having a cutting edge thereon wherein said support frame includes an arm portion, from which the saw blade projects, and a plate underlying the saw and including bearing means supporting the saw on said plate and including fluid flow passage means in said plate for use in lubricating said bearing means.

22. A felling head comprising in combination:
(a) a frame having a grapple mounted thereon and comprising a pair of jaw members, at least one of which is pivotally mounted on the frame for movement toward and away from the other and together providing a grapple jaw which may be selectively opened and closed to respectively receive and grasp a standing tree, power means connected to said movable grapple jaw members selectively to open and close said grapple; and
(b) a severing device mounted on said frame below said grapple for severing a standing tree, said severing device comprising an anvil mounted on said frame, an arm pivotally mounted on said frame and including bearing means for supporting a circular saw, a rim driven circular saw journalled for rotation on said bearing means and having combined gear and cutting teeth around the outer periphery thereof; a motor unit mounted on said arm and having a pinion mounted directly thereon, the teeth of said pinion meshing with the teeth on the circular saw for driving the same, both said pinion and saw rotating in a common plane.

23. A felling head as defined in claim 22 wherein said anvil is arcuate.

24. A felling head as defined in claim 22 wherein said frame has a plate mounted thereon for supporting the butt end of a plurality of cut trees and wherein said grapple is an accumulator grapple of the type which includes an additional arm for holding and accumulating trees as they are cut.

25. A felling head as defined in claim 24 wherein an edge of said plate comprises said anvil.

26. Apparatus for transversely cutting elongate articles such as trees or the like and particularly standing trees comprising:
(a) a frame having an anvil thereon;
(b) an arm pivotally mounted on said frame and having an arcuate portion facing the anvil and a plate projecting from said arcuate portion, said plate having annular bearing means for supporting a circular saw;
(c) a rim driven circular saw supported on said annular bearing means, pivotal movement of said arm moving said saw towards said anvil for cutting an article disposed between the saw and the anvil and and movable away therefrom to receive another article to be cut, said rim driven saw having combined gear and cutting teeth around the outer periphery thereof projecting in a direction outwardly from the axis of rotation of the saw; and
(d) a motor unit mounted on said arm and having a pinion mounted directly thereon, the teeth of said pinion meshing with the teeth on the circular saw for driving the same, said pinion and said saw being disposed in a common plane.

27. Apparatus as defined in claim 26 wherein said anvil is concave, such concavity facing the arcuate portion of said arm.

28. Apparatus as defined in claim 26 wherein said anvil has a sharpened edge facing said circular saw.

29. Apparatus as defined in claim 26 wherein said anvil comprises a flat plate.

30. A rim driven cutter comprising:
a circular saw and a drive pinion rotatable about respective ones of a pair of spaced apart parallel axes, each of said saw and pinion having projections of gear tooth form about the periphery thereof with the teeth of one meshing with those of the other, the teeth on said saw each having a cutting edge set back from the normal intersection of the face and the top land of the teeth,
a plate carried by a rigid frame and bearing means mounting said saw on said plate, said plate having a thickness at least no greater than the kerf generated by the driven member and wherein said pinion is fabricated from a non-metallic substance.

31. A saw as defined in claim 30 wherein said plate underlies a major central portion of the saw.

32. A saw as defined in claim 30 wherein said pinion is molded from a plastics material.

33. A rim driven saw as defined in claim 30 wherein at least the teeth of the drive pinion are made of a softer material than that of the gear tooth portions of the saw.

34. A rim driven saw as defined in claim 33 wherein said drive pinion is made of non-metallic material.

35. A rim driven saw as defined in claim 34 wherein said drive pinion is made from a plastics material.

36. A rim driven saw as defined in claim 35 wherein said plastics material is nylon.

37. A felling head comprising in combination:
(a) a frame having a grapple mounted thereon comprising a pair of jaw members, at least one of which is selectively movable away from and toward the other and together providing a grapple jaw which thus may be selectively open and closed to respectively receive and grasp a standing tree, power means connected to said movable grapple jaw members selectively to open and close said grapple; and
(b) a severing device carried by said frame and located at a position below said grapple for severing a standing tree grasped by the grapple, said severing device being a rim driven cutter comprising:
a circular saw and a drive pinion rotatable about respective ones of a pair of spaced apart parallel axes, each of said saw and pinion having projections of gear tooth form about the periphery thereof with the teeth of one meshing with those of the other whereby the pinion and saw are in a drive driven relationship, the teeth on said saw each having a cutting edge set back from the normal intersection of the face and the top land of the tooth, a plate carried by a rigid frame and bearing means mounting said circular saw on said plate, said plate having a thickness at least no greater than the kerf generated by the driven member and located within the boundaries of such kerf and wherein said pinion is fabricated from a non-metallic substance, and
power means drivingly connected to said drive pinion.

38. A felling head as defined in claim 37 wherein the rigid frame of the severing device is pivotally mounted on the frame of the felling head.

39. A felling head comprising in combination:
(a) a frame having a grapple mounted thereon and comprising a pair of jaw members, at least one of which is pivotally mounted on the frame for movement toward and away from the other and together providing a grapple jaw which may be selectively opened and closed to respectively receive and grasp a standing tree, power means connected to said movable grapple jaw members selectively to open and close said grapple; and
(b) a severing device mounted on said frame below said grapple for severing a standing tree, said severing device comprising an anvil mounted on said frame, an arm pivotally mounted on said frame and including bearing means for supporting a circular saw, a rim driven circular saw journalled for rotation on said bearing means and having combined gear and cutting teeth around the outer periphery thereof; a motor unit mounted on said arm and being drivingly connected to a pinion gear having the teeth thereof meshing with the teeth on the circular saw for driving the same, both said pinion and saw rotating in a common plane.

40. Apparatus for transversely cutting elongate articles such as trees or the like and particularly standing trees comprising:
(a) a frame having an anvil thereon;
(b) an arm pivotally mounted on said frame and having an arcuate portion facing the anvil and a plate projecting from said arcuate portion, said plate having annular bearing means for supporting a circular saw;
(c) a rim driven circular saw supported on said annular bearing means, pivotal movement of said arm moving said saw towards said anvil for cutting an article disposed between the saw and the anvil and movable away therefrom to receive another article to be cut, said rim driven saw having combined gear and cutting teeth around the outer periphery thereof projecting in a direction outwardly from the axis of rotation of the saw; and
(d) a motor unit mounted on said arm and being drivingly connected to a pinion gear having the teeth thereof meshing with the teeth on the circular saw for driving the same, said pinion and said saw being disposed in a common plane.

* * * * *